United States Patent

[11] 3,630,432

| [72] | Inventor | Jakob Murkes<br>Bandhagen, Sweden |
| [21] | Appl. No. | 829,858 |
| [22] | Filed | June 3, 1969 |
| [45] | Patented | Dec. 28, 1971 |
| [73] | Assignee | Alfa-Laval AB<br>Tumba, Sweden |
| [32] | Priority | June 6, 1968 |
| [33] | | Sweden |
| [31] | | 7575/68 |

[54] APPARATUS FOR SEPARATING A LIQUID MIXTURE
1 Claim, 1 Drawing Fig.

[52] U.S. Cl. .................................................. 233/45
[51] Int. Cl. ................................................ B04b 11/00
[50] Field of Search............................................. 233/21, 27, 28, 46, 45, 47, 16, 34, 35, 29, 30, 31, 32, 33, 36, 37; 417/10

[56] References Cited
UNITED STATES PATENTS

| 690,883 | 1/1902 | Sharples | 233/21 |
| 718,461 | 1/1903 | Hult | 233/16 |
| 2,403,089 | 7/1946 | Lars | 233/21 |
| 2,622,797 | 12/1952 | Hemfort | 233/21 X |
| 3,398,689 | 8/1968 | Allington | 417/410 |

Primary Examiner—Jordan Franklin
Assistant Examiner—George H. Krizmanich
Attorney—Davis, Hoxie, Faithfull & Hapgood ABSTRACT: The liquid mixture to be separated, such as oil and water, is supplied by a rotary displacement pump having a variable speed drive for controlling the supply rate, and the mixture entering the pump is supplied in its entirety to a centrifugal separator having an inlet arranged to bring the supplied mixture into rotation by means of a smooth surface of revolution concentric to the rotation axis of the separator. In this way, the apparatus avoids the risk of breaking the liquid droplets of the mixture and thereby impairing the separating effect.

Patented Dec. 28, 1971
3,630,432
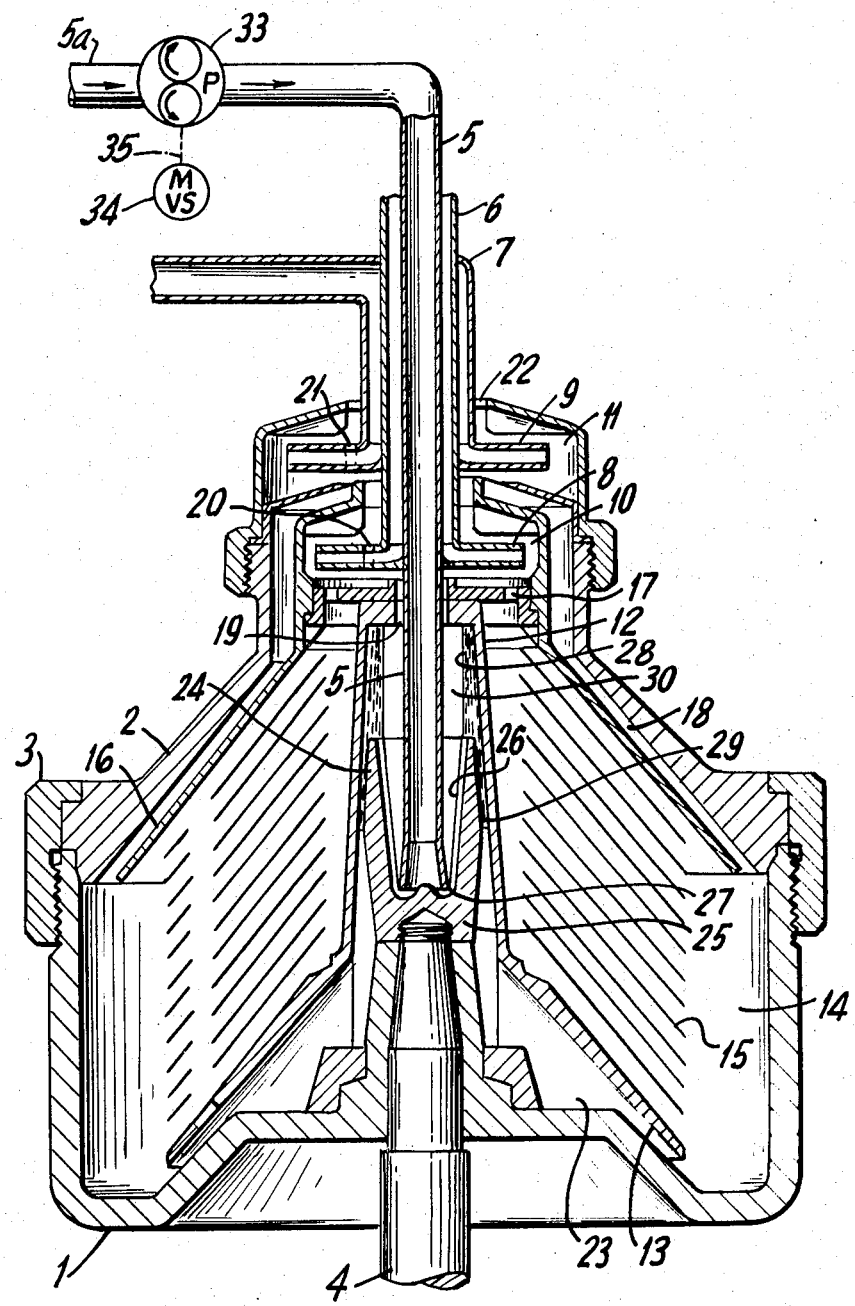
INVENTOR.
JAKOB MURKES
BY
Davis, Hoxie, Faithfull & Hapgood
ATTORNEYS

3,630,432

APPARATUS FOR SEPARATING A LIQUID MIXTURE

The present invention relates to apparatus for separating a liquid mixture, especially of oil and particularly mineral oil and water.

When mechanically separating a discontinuous liquid phase from a continuous liquid phase, it is highly important that the liquid mixture be treated with the greatest possible care so that the droplet size of the discontinuous phase is not reduced. Otherwise, the separation result is influenced very unfavorably. This rule is of special importance when an easily emulsifiable mixture of oil and water is to be separated in a centrifugal separator in which the bringing of the liquid mixture, entering the separator, into rotation can break the droplets of the discontinuous phase, whereby the separation of these droplets is rendered more difficult. The separation result, however, is also dependent upon the condition of the discontinuous phase when the liquid mixture arrives at the separator inlet.

The present invention has for its object to provide an arrangement whereby the liquid mixture is treated with care not only in the centrifugal separator but also in the pipeline in advance of the separator.

The apparatus of the invention comprises a rotary displacement pump adapted to be controlled as to its rotational speed and arranged to supply a flow of the liquid mixture, entering the pumping means of the pump, in its entirety to a centrifugal separator, the inlet of the latter being arranged to being the supplied liquid mixture into rotation by means of a rotating smooth surface of the revolution which is concentric to the rotation axis of the separator. In other words, in the new apparatus the control of the feed of the liquid mixture to the separator is not allowed to take place under flow conditions which unnecessarily break the liquid droplets. For this reason, the feed to the separator according to the invention is not allowed to be controlled by throttling, but instead the feed must be controlled by an adjustment of the rotational speed of the pump. Moreover, no return flow is allowed to take place within the pump, and for this reason a displacement pump is used. Furthermore, for similar reasons, no return flow from the pressure side to the suction side of the pump is allowed to take place. According to the invention, the risk of breaking the liquid droplets of the mixture in the separator is reduced by bringing the liquid mixture into rotation without impacts in the separator inlet.

As will be evident from the foregoing, the present invention involves a recognition of and solution to the problem of protecting the droplets of the liquid mixture against breaking on their way from the suction side of the pump to the separation space of the separator, so that they are in a condition as undamaged as possible when subjected to the sedimentation forces in the centrifugal separator.

For a better understanding of the invention, reference may be had to the following detailed description of an example of the new apparatus as illustrated in the accompanying drawing, in which the single illustration shows the example partly in vertical section and partly in elevation.

Referring to the drawing, the apparatus comprises a stationary pipeline 5a for supplying the liquid mixture to be separated and in which a rotary displacement pump 33 is inserted. The displacement pump 33 is driven from a variable speed drive which, as shown, includes a variable speed motor 34 having a driving connection 35 to the pump, the latter being shown in the form of a gear pump. Thus, the rate at which the liquid mixture is supplied to the separator can be varied by adjusting the speed of motor 34 and therefore the rotational speed of the displacement pump 33.

The supply pipe 5a has a portion 5 extending downwardly from the outlet of pump 33 into the rotor 1 of a centrifugal separator, the rotor having a cover 2 which is retained by a locking ring 3. The rotor 1 is supported on and driven by a shaft 4, and extending into the rotor are the stationary inlet pipe 5 and two stationary outlet pipes 6 and 7, the two outlet pipes being connected to stationary paring discs 8 and 9, respectively. The paring discs 8 and 9 are located in paring chambers 10 and 11, respectively, in the rotor. A distributor in the rotor is provided with an upper part 12 having a slight conicity and a lower part 13 having a more pronounced conicity; and the distributor 12–13 partly defines a passage through which liquid introduced by feedpipe 5 is conveyed to a separating chamber 14 of the rotor. Chamber 14 contains a set of conical discs 15 and a conical top disc 16, the upper part of which forms the paring chamber 10. Holes 17 connect the space inside the inner edges of the disc set 15 to the paring chamber 10. An interspace 18 between the top disc 16 and the rotor cover 2 connects the outer part of the separating chamber 14 with paring chamber 11. A clearance 19 around the inlet pipe 5 and axial ports 20 and 21 in the paring discs 8 and 9, respectively, connect a central air space in the distributor part 12 to the surrounding atmosphere, more exactly by way of a clearance 22 between the rotor top and the pipe 7. The distributor part 13 is provided with radial entraining vanes 23.

An internally conical hollow body 24 with a bottom 25 is screwed onto the top of the shaft 4. The feedpipe 5 opens so close to this end wall 25 that a continuous thin conical liquid layer 26 is formed from the pipe opening 27 up to a cylindrical liquid level 28. A part of the outside of the hollow body 24 forms with the inside of the distributor part 12 a conical slot 29 of uniform thickness. An airspace 30 is formed inside the level 28.

The supply pipe 5 is kept completely filled with the liquid mixture. The liquid discharging from the pipe opening 27 meets the opposing end wall 25 and is deflected immediately at the pipe opening so that the liquid, without air admixture, is spread into a thin layer 26 on the rotating inner surface of the body 24; and a rotary movement is imparted to this layer by friction with this inner surface but while allowing sliding of the liquid. Under the action of the centrifugal force, air is then separated from the liquid, and this air leaves the airspace 30 through the connecting clearances and ports 19 through 22 and reaches the surrounding atmosphere. The layer 26 is shown with the maximum possible extension, i.e., to the top of the hollow body 24. In order to avoid air admixture, the level 28 must not be kept radially outside the inside of the body 24. The liquid passes on its way to the separating chamber 14 through the narrow slot 29, and its speed of rotation is increased still more by its frictional contact with the inner and outer surfaces of the slot 29. Before the liquid reaches the radial vanes 23, it should have obtained essentially the same speed of rotation as the rotor, so that a splitting of the droplets of the liquid mixture is avoided when the liquid meets the vanes 23. The oil or other light component separated in the disc set 15 flows through the holes 17 into the paring chamber 10 and is discharged by the paring disc 8. In a similar way, the water or other heavy component flows from the periphery of the separating chamber 14 through the slot 18 and into the paring chamber 11 and is discharged by the paring disc 9.

I claim:

1. Apparatus for separating a liquid mixture, especially of oil and water, which comprises a stationary supply pipeline for the mixture, a centrifugal separator including a rotor having a separating chamber and provided with an inlet to which the pipeline leads, the pipeline having a discharge end located within the rotor, means rotatable with the rotor and forming a hollow body having an end wall extending transversely of the rotor axis and closely opposing said discharge end of the feed pipeline, said hollow body also having an inner surface forming a smooth surface of revolution concentric to the rotor axis and extending in surrounding relation to the pipeline while widening conically from its said discharge end, said smooth surface being operable to direct a layer of the mixture from said end wall while bringing said mixture into rotation, the rotor including means maintaining a liquid level into which said smooth surface submerges and also including means forming a passage for flow of the mixture from said surface to the separating chamber, a displacement pump in said pipeline by which the flow of liquid entering the pump is fed in its entirety to said inlet of the centrifugal rotor, and variable speed means for driving the pump to control the flow rate of the liquid to said rotor inlet.

* * * * *